US012544085B2

(12) United States Patent
Shih et al.

(10) Patent No.: US 12,544,085 B2
(45) Date of Patent: Feb. 10, 2026

(54) DEVICE FOR ULTRASOUND ASSISTED THROMBOLYSIS

(71) Applicant: METAL INDUSTRIES RESEARCH & DEVELOPMENT CENTRE, Kaohsiung (TW)

(72) Inventors: Wei-Hung Shih, Kaohsiung (TW); Bo-Wei Pan, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 320 days.

(21) Appl. No.: 18/530,569

(22) Filed: Dec. 6, 2023

(65) Prior Publication Data

US 2025/0186072 A1 Jun. 12, 2025

(51) Int. Cl.
*A61B 17/22* (2006.01)
*A61B 17/00* (2006.01)

(52) U.S. Cl.
CPC *A61B 17/2202* (2013.01); *A61B 2017/00084* (2013.01); *A61B 2017/00778* (2013.01)

(58) Field of Classification Search
CPC ................ A61B 17/22; A61B 17/2202; A61B 2017/00106; A61B 2017/00778; A61B 2017/22088; A61B 2090/3784; A61B 17/22029; A61B 2017/22084; A61B 2090/061
See application file for complete search history.

(56) References Cited

U.S. PATENT DOCUMENTS 4,574,812 A * 3/1986 Arkans ................ A61B 5/0285 600/506
2024/0407795 A1* 12/2024 McCleary ........ A61B 17/22012

FOREIGN PATENT DOCUMENTS

TW I621460 B 4/2018
TW 201827074 A 8/2018
WO WO-2025027549 A1 * 2/2025 ............ A61N 7/022

OTHER PUBLICATIONS

Taiwanese Office Action mailed Feb. 27, 2024 for Taiwanese Patent Application No. 112145039, 3 pages.

* cited by examiner

*Primary Examiner* — Katherine H Schwiker
*Assistant Examiner* — Zehra Jaffri
(74) *Attorney, Agent, or Firm* — Demian K. Jackson; Jackson IPG PLLC

(57) ABSTRACT

A device for ultrasound assisted thrombolysis includes a catheter, a first ultrasound module, a second ultrasound module and a controller. The first and second ultrasound modules are mounted in the catheter and electrically connected to the controller. The first ultrasound module is provided to transmit ultrasonic waves toward a thrombus to assist thrombolysis. The second ultrasound module is provided to transmit ultrasonic waves toward the thrombus for measuring a distance between the catheter and the thrombus. The controller is provided to control the first and second ultrasound modules according to the distance.

16 Claims, 5 Drawing Sheets

DEVICE FOR ULTRASOUND ASSISTED THROMBOLYSIS

FIELD OF THE INVENTION

This invention relates to a device for ultrasound assisted thrombolysis, and more particularly to a device for ultrasound assisted thrombolysis which is able to real-time monitor thrombus removal condition.

BACKGROUND OF THE INVENTION

Systemic thrombolysis, mechanical thrombectomy and ultrasound assisted thrombolysis are conventional thrombus removal treatments. High-dose thrombolytic agent is usually injected into emergency patient's vein during systemic thrombolysis, but it may cause internal bleeding easily. Patient needs to expose to X-ray radiation for a while during mechanical thrombectomy. Thrombolytic agent dose required in ultrasound assisted thrombolysis is lower than that in systemic thrombolysis, but bleeding risk in patient is still high. Otherwise, real-time monitoring of thrombus is not feasible in the thrombus removal treatments mentioned above.

SUMMARY

One object of the present invention is to provide a device for ultrasound assisted thrombolysis. A first ultrasonic wave is provided to assist thrombolysis and a second ultrasonic wave is further provided to measure the distance between thrombus and a catheter to monitor thrombus removal conditions. Accordingly, thrombolytic agent dose can be reduced to lower bleeding risk of patient.

A device for ultrasound assisted thrombolysis of the present invention includes a catheter, a first ultrasound module, a second ultrasound module and a controller. The catheter includes a wall and an accommodation space surrounded by the wall. The first ultrasound module is mounted in the accommodation space and provided to transmit a first ultrasonic wave which is provided to dissolve a thrombus located outside the catheter. The second ultrasound module is mounted in the accommodation space and provided to transmit a second ultrasonic wave which is provided to act on the thrombus and allow a third ultrasonic wave to be reflected from the thrombus. A frequency of the second ultrasonic wave is greater than that of the first ultrasonic wave. The controller is electrically connected to the first and second ultrasound modules and is provided to measure a distance between the catheter and the thrombus based on a time difference between transmitting the second ultrasonic wave and receiving the third ultrasonic wave, and the controller is provided to determine whether switching on continuously or switching off the first and second ultrasound modules based on the measured distance.

DETAILED DESCRIPTION OF THE INVENTION

Figure 1:
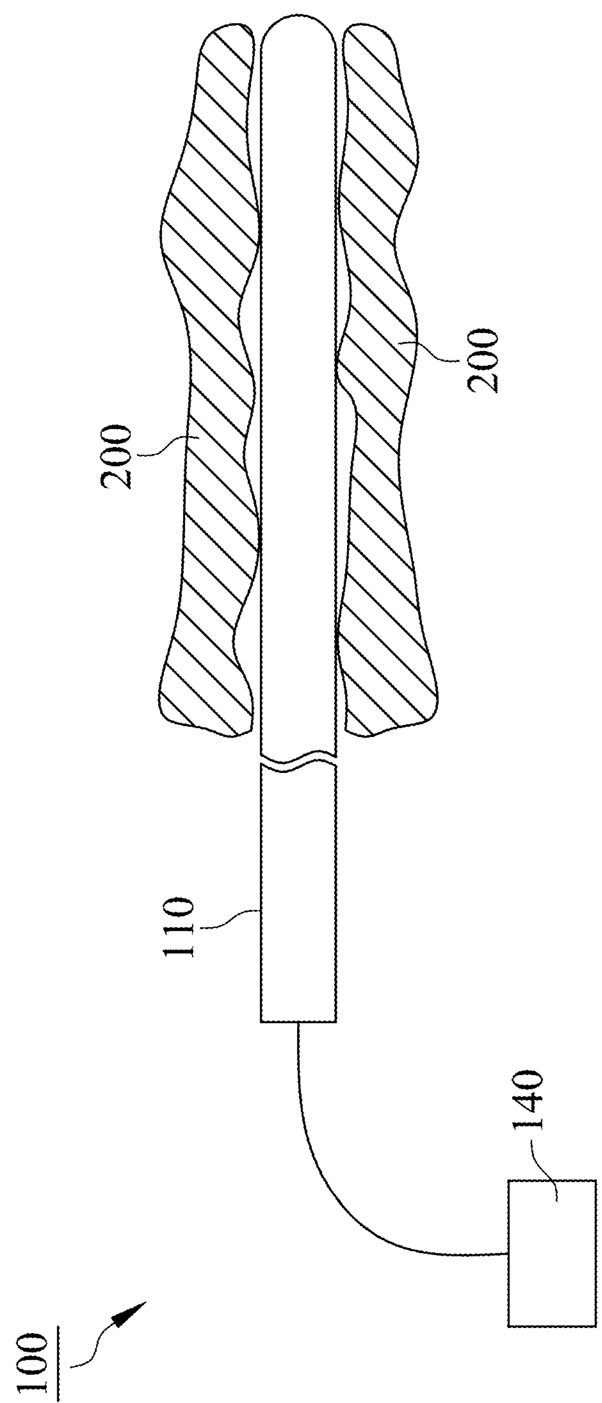
FIG. 1 is a diagram illustrating a device for ultrasound assisted thrombolysis in accordance with a one embodiment of the present invention.

With reference to FIG. 1, the present invention discloses a device 100 for ultrasound assisted thrombolysis (USAT) which is provided to degrade fibrins (not shown) in a thrombus 200. Thus, it is available to increase transport of a thrombolytic agent into the thrombus 200 to accelerate thrombolysis. During thrombolysis therapy, the device 100 is further provided to monitor removal condition of the thrombus 200 in real time so the thrombolytic agent dose can be reduced significantly to avoid internal bleeding in patient.

Figure 2:
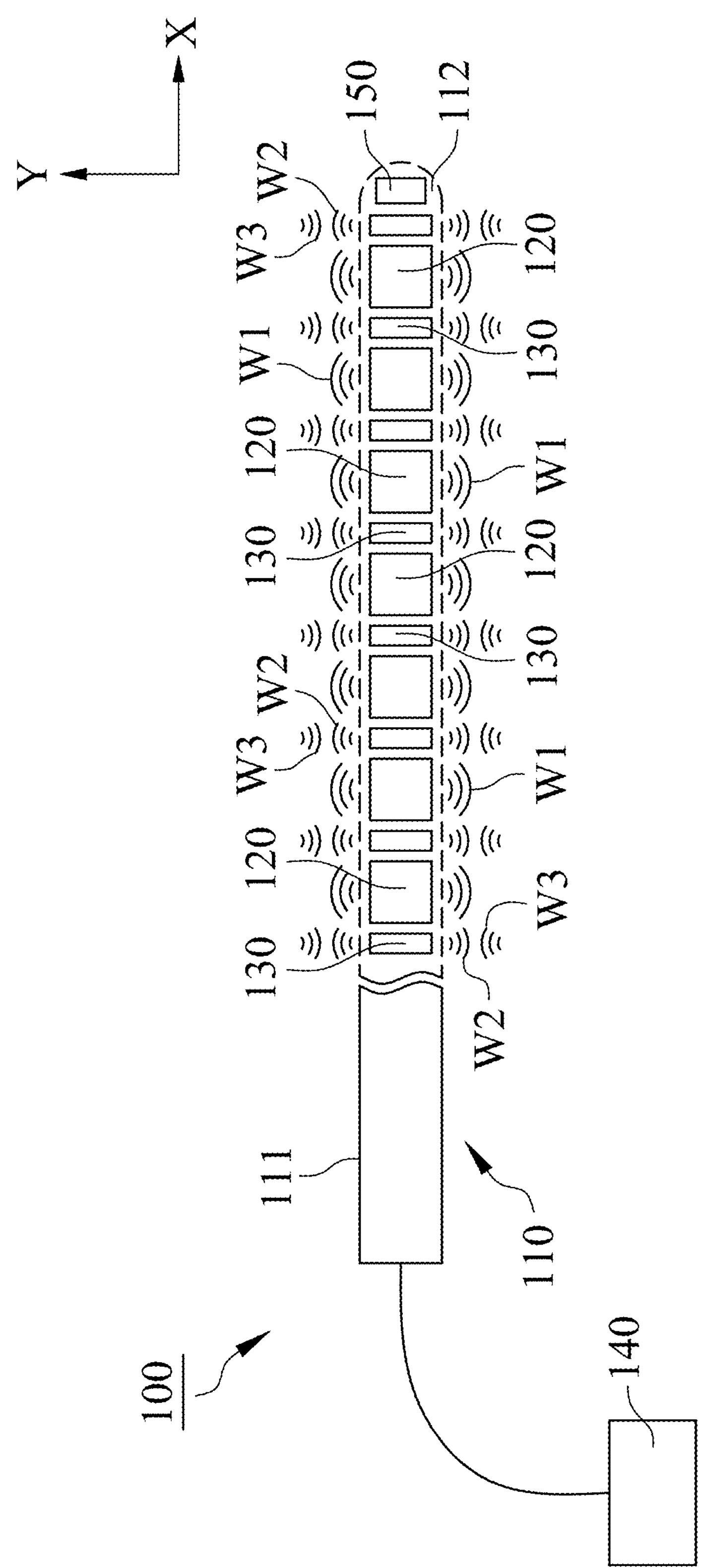
FIG. 2 is a diagram illustrating a device for ultrasound assisted thrombolysis in accordance with a one embodiment of the present invention.

With reference to FIG. 2, the device 100 includes a catheter 110, at least one first ultrasound module 120, at least one second ultrasound module 130 and a controller 140. The catheter 110 has a wall 111 and an accommodation space 112 surrounded by the wall 111. The first ultrasound module 120 and the second ultrasound module 130 are mounted in the accommodation space 112 and located in front end of the catheter 110. The first ultrasound module 120 is provided to generate a first ultrasonic wave W1, and the second ultrasound module 130 is provided to generate a second ultrasonic wave W2. The controller 140 is electrically connected to the first ultrasound module 120 and the second ultrasound module 130 and is provided to control the first ultrasound module 120 and the second ultrasound module 130 to allow the first ultrasound module 120 to transmit the first ultrasonic wave W1 towards outside of the catheter 110 and allow the second ultrasound module 130 to transmit the second ultrasonic wave W2 towards outside of the catheter 110.

Preferably, the device 100 includes a plurality of first ultrasound modules 120 and a plurality of second ultrasound modules 130. The first ultrasound modules 120 and the second ultrasound modules 130 are alternately arranged in the accommodation space 112 along an axial direction X of the catheter 110, in other words, each of the first ultrasound modules 120 is located between the two adjacent second ultrasound modules 130. In a direction Y intersecting the axial direction X, each of the first ultrasound modules 120 can transmits the first ultrasonic wave W1 towards outside of the catheter 110, and each of the second ultrasound modules 130 can transmit the second ultrasonic wave W2 towards outside of the catheter 110. In this embodiment, the direction Y and the axial direction X of the catheter 110 are perpendicular.

Referring to FIGS. 1 and 2, after the catheter 110 is placed near the blood vessel where the thrombus 200 is located in, the catheter 110 is moved to allow its front end to contact the thrombus 200. Next, the second ultrasound module 130 is switched on by the controller 140 to transmit the second ultrasonic wave W2 toward the thrombus 200 located outside the catheter 110. The second ultrasonic wave W2 acts on the thrombus 200 and allows a third ultrasonic wave W3 to be reflected to the second ultrasound module 130 from the thrombus 200. The controller 140 can measure an initial distance between the catheter 110 and the thrombus 200 according to a time difference between transmitting the second ultrasonic wave W2 and receiving the third ultrasonic wave W3. After initial distance measurement, the first ultrasound module 120 is switched on by the controller 140 to transmit the first ultrasonic wave W1 toward the thrombus 200 located outside the catheter 110 to assist to dissolve the thrombus 200. Fibrins in the thrombus 200 can be degraded to fragments by positive and negative pressures of the first ultrasonic wave W1 such that the thrombolytic agent can be transported into the thrombus 200 easily to accelerate thrombolysis. Preferably, the first ultrasonic wave W1 is low frequency pulse ultrasound with frequency of 1.5-2.5 MHz thereby avoiding heat damage on vascular tissue. Frequency of the second ultrasonic wave W2 is greater than that of the first ultrasonic wave W1 in order to increase distance measurement resolution within radius of blood vessels. Preferably, frequency of the second ultrasonic wave W2 is between 15 MHz and 25 MHz.

During thrombolysis therapy, the second ultrasound module 130 is regularly switched on by the controller 140 for distance measurement, so the controller 140 can adjust output frequency and power of the first ultrasound module 120 and the second ultrasound module 130 based on the distance between the catheter 110 and the thrombus 200, and it can determine whether switching on continuously or switching off the first ultrasound module 120 and the second ultrasound module 130 based on the distance between the catheter 110 and the thrombus 200. In the present invention, the second ultrasound module 130 is provided to real-time monitor the distance between the catheter 110 and the thrombus 200 and allow distance variation to be visible to medical personnel. Distance monitor can help medical personnel to know thrombus dissolving condition immediately and evaluate whether continuing thrombolysis treatment. Preferably, the first ultrasound module 120 and the second ultrasound module 130 are not switched on by the controller 140 at the same time because the first ultrasonic wave W1 may influence distance measurement negatively.

With reference to FIG. 2, preferably, the device 100 further includes a temperature sensor 150 which is mounted in the accommodation space 112 of the catheter 110 and electrically connected to the controller 140. During thrombolysis treatment, the temperature sensor 150 is provided to sense a temperature in the catheter 110 and/or a temperature outside the catheter 110. The controller 140 can adjust output frequency and power of the first ultrasound module 120 and the second ultrasound module 130 according to the temperature so vascular tissue is protected from heat damage. In this embodiment, the temperature sensor 150 is mounted in the most front end of the catheter 110. But position of the temperature sensor 150 in the catheter 110 is not restricted in the present invention, the temperature sensor 150 can be placed in any position close to the first ultrasound module 120 and the second ultrasound module 130.

Targeted ultrasound contrast agent can be used in thrombolysis. In a preferred embodiment, the targeted ultrasound contrast agent is microbubbles which are filled with PTFE gas (polytetrafluoroethylene) and coated with receptors on surface. The receptors can recognize glycoproteins GP Iib/IIIa so they can recognize thrombi specifically to increase local concentration of contrast agent around thrombi. Positive and negative pressures of the first ultrasonic wave W1 can induce oscillation of the targeted ultrasound contrast agent and cavitation of thrombi to help the thrombolytic agent to be transported into thrombi and accelerate thrombolysis. In other embodiments, the thrombolytic agent is not necessary, the device 100 of the present invention can be used for thrombolysis with only the targeted ultrasound contrast agent.

Figure 3B:
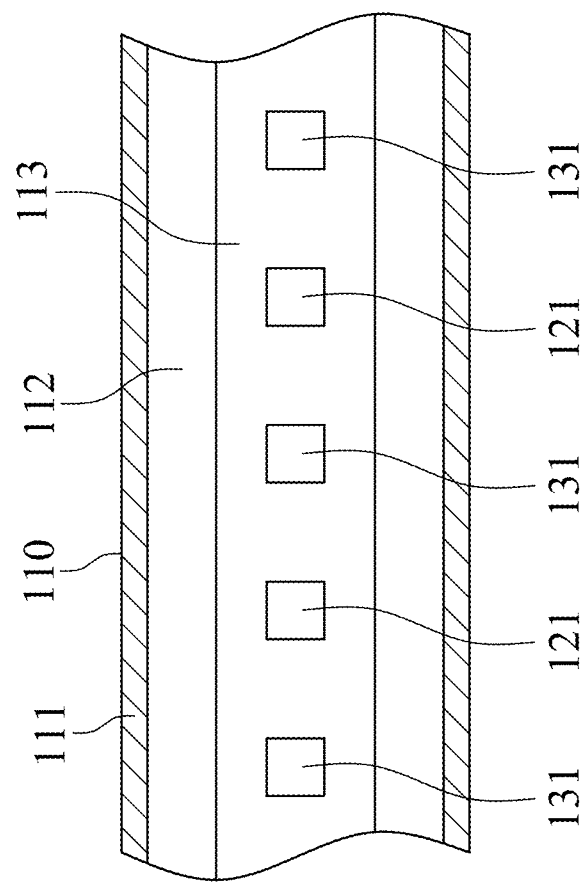
FIG. 3*b* is a lateral sectional view of a catheter in accordance with a first embodiment of the present invention.
Figure 3A:
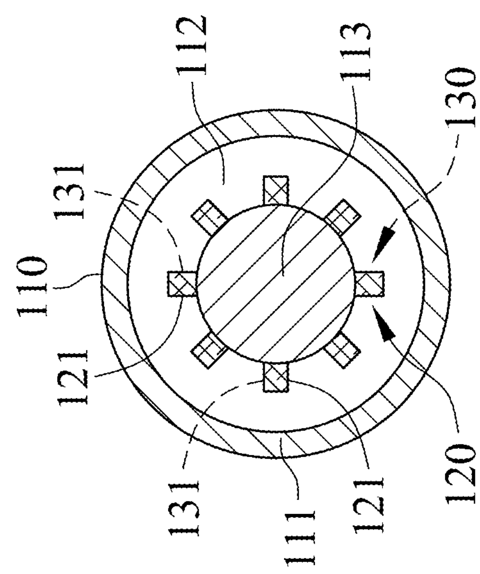
FIG. 3*a* is a longitudinal sectional view of a catheter in accordance with a first embodiment of the present invention.

Preferably, the catheter 110 further includes an inner core 113 as shown in FIG. 3*a*. The inner core 113 is placed in the accommodation space 112 and made of a flexible material. While moving the catheter 110 to target position by medical personnel, the inner core 113 can help to move the catheter 110 in blood vessel smoothly.

FIGS. 3*a* and 3*b* are longitudinal and lateral sectional views of the catheter 110 in accordance with a first embodiment of the present invention, respectively. In the first embodiment, the first ultrasound module 120 includes a plurality of ultrasonic transducers 121 which are arranged in the accommodation space 112 annularly to construct a transducer array. As a result, first ultrasonic waves W1 can be transmitted 360 degrees towards outside of the catheter 110 from the first ultrasound module 120 to assist thrombolysis. Similarly, the second ultrasound module 130 includes a plurality of ultrasonic transducers 131 annularly arranged in the accommodation space 112, and second ultrasonic waves W2 can be transmitted 360 degrees towards outside of the catheter 110 from the second ultrasound module 130 to fully monitor the distance between the catheter 110 and the thrombus 200.

Referring to FIGS. 3*a* and 3*b*, the ultrasonic transducers 121 and 131 in the first embodiment are annularly arranged on the inner core 113 with the same angle. Thus, each of the ultrasonic transducers 121 and 131 is located between the wall 111 and the inner core 113, and each of the ultrasonic transducers 121 and the adjacent ultrasonic transducer 131 are arranged in a row on the inner core 113.

Figure 4B:
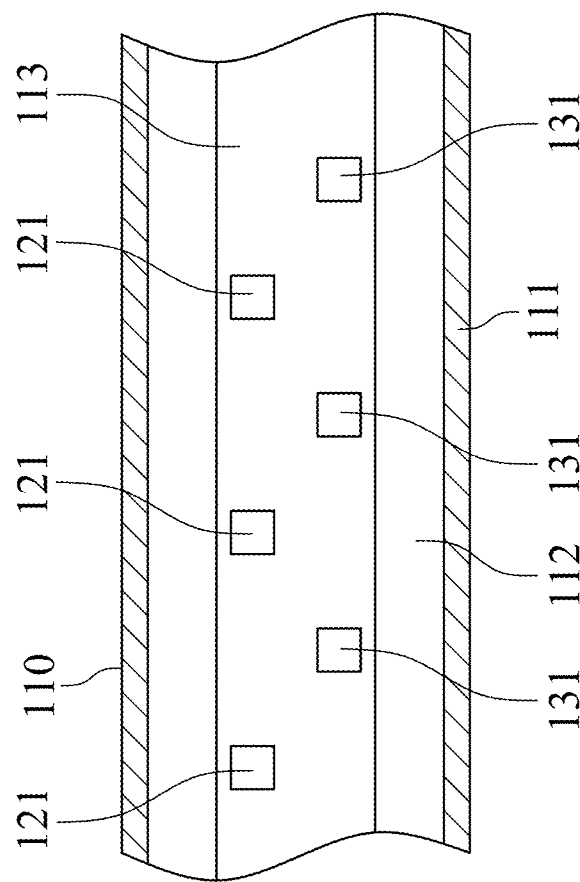
FIG. 4*b* is a lateral sectional view of a catheter in accordance with a second embodiment of the present invention.
Figure 4A:
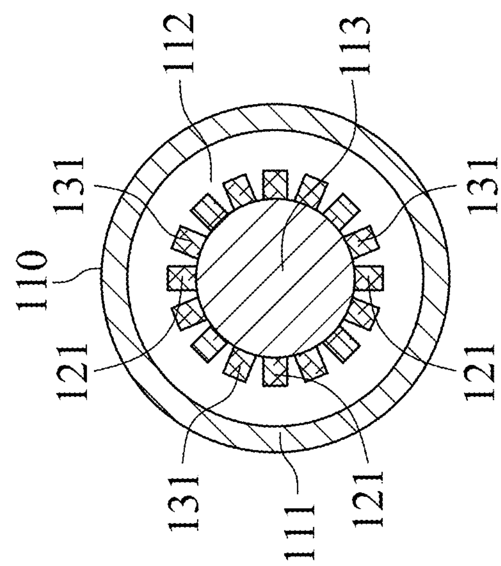
FIG. 4*a* is a longitudinal sectional view of a catheter in accordance with a second embodiment of the present invention.

FIGS. 4*a* and 4*b* illustrate a second embodiment of the present invention. Different to the first embodiment, the ultrasonic transducers 121 and 131 are annularly arranged on the inner core 113 with different angles in the second embodiment. Consequently, they are arranged in different rows on the inner core 113.

Figure 5:
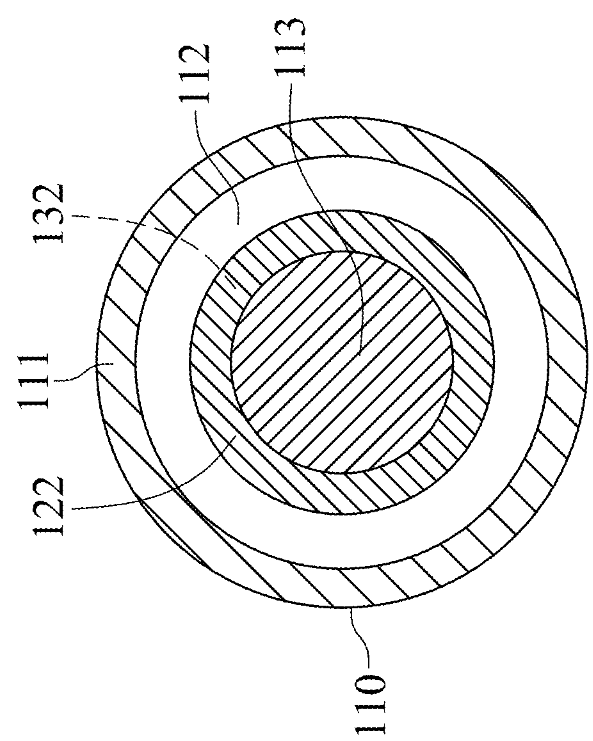
FIG. 5 is a longitudinal sectional view of a catheter in accordance with a third embodiment of the present invention.

With reference to FIG. 5, in a third embodiment of the present invention, the first ultrasound module 120 includes an annular ultrasonic transducer 122, and the second ultrasound module 130 includes an annular ultrasonic transducer 132. The annular ultrasonic transducers 122 and 132 are mounted in the accommodation space 112 along the wall 111, respectively. First ultrasonic waves W1 can be transmitted 360 degrees toward outside of the catheter 110 from the annular ultrasonic transducer 122. No matter where the thrombus 200 is located outside the catheter 110, at least one first ultrasonic wave W1 can be transmitted towards the thrombus 200 for thrombolysis. Second ultrasonic waves W2 can be transmitted 360 degrees toward outside of the catheter 110 to fully monitor the distance from the catheter 110 to the thrombus 200. Preferably, the annular ultrasonic transducers 122 and 132 are sleeved on the inner core 113 so they are located between the wall 111 and the inner core 113.

The first ultrasonic wave W1 can increase penetration of thrombolytic agent so it is available to reduce thrombolytic agent dose to avoid bleeding in patient. Furthermore, the second ultrasonic wave W2 is used to measure the distance between the catheter 110 and the thrombus to real-time monitor the thrombus. The first ultrasound module 120 and the second ultrasound module 130 can be controlled automatically by the controller 140 according to thrombus dissolving condition, and medical personnel can determine whether can discontinue thrombolysis treatment in advance.

While this invention has been particularly illustrated and described in detail with respect to the preferred embodiments thereof, it will be clearly understood by those skilled in the art that is not limited to the specific features shown and described and various modified and changed in form and details may be made without departing from the scope of the claims.

What is claimed is:

1. A device for ultrasound assisted thrombolysis comprising:

a catheter including a wall and an accommodation space which is surrounded by the wall;

at least one first ultrasound module mounted in the accommodation space and configured to transmit a first ultrasonic wave, the first ultrasonic wave is configured to dissolve a thrombus located outside the catheter;

at least one second ultrasound module mounted in the accommodation space and configured to transmit a second ultrasonic wave, the second ultrasonic wave is configured to act on the thrombus and allow a third ultrasonic wave to be reflected from the thrombus, wherein a frequency of the second ultrasonic wave is greater than a frequency of the first ultrasonic wave; and a controller electrically connected to the at least one first ultrasound module and the at least one second ultrasound module, the controller is configured to measure a distance between the catheter and the thrombus according to a time difference between transmitting the second ultrasonic wave and receiving the third ultrasonic wave, and the controller is configured to switch on continuously or switch off the at least one first ultrasound module and the at least one second ultrasound module according to the distance between the catheter and the thrombus.

2. The device in accordance with claim 1, wherein the at least one first ultrasound module includes a plurality of ultrasonic transducers which are arranged in the accommodation space annularly.

3. The device in accordance with claim 2, wherein the at least one second ultrasound module includes a plurality of ultrasonic transducers which are arranged in the accommodation space annularly.

4. The device in accordance with claim 3, wherein the catheter further includes an inner core, the inner core is placed in the accommodation space, and the plurality of ultrasonic transducers of the at least one first ultrasonic module and/or the at least one second ultrasonic module are located between the inner core and the wall.

5. The device in accordance with claim 1, wherein the at least one second ultrasound module includes a plurality of ultrasonic transducers which are arranged in the accommodation space annularly.

6. The device in accordance with claim 5, wherein the catheter further includes an inner core, the inner core is placed in the accommodation space, and the plurality of ultrasonic transducers are located between the inner core and the wall.

7. The device in accordance with claim 1, wherein the at least one first ultrasound module includes a first annular ultrasonic transducer which is mounted in the accommodation space along the wall.

8. The device in accordance with claim 7, wherein the at least one second ultrasound module includes a second annular ultrasonic transducer which is mounted in the accommodation space along the wall.

9. The device in accordance with claim 8, wherein the catheter further includes an inner core, the inner core is placed in the accommodation space, and the first and/or the second annular ultrasonic transducer is located between the inner core and the wall.

10. The device in accordance with claim 1, wherein the at least one second ultrasound module includes an annular ultrasonic transducer which is mounted in the accommodation space along the wall.

11. The device in accordance with claim 10, wherein the catheter further includes an inner core, the inner core is placed in the accommodation space, and the annular ultrasonic transducer is located between the inner core and the wall.

12. The device in accordance with claim 1, wherein the at least one first ultrasound module comprises a plurality of first ultrasound modules and the at least one second ultrasound module comprises a plurality of second ultrasound modules, wherein the plurality of first and second ultrasound modules are alternately arranged in the accommodation space along an axial direction of the catheter.

13. The device in accordance with claim 1, wherein the frequency of the first ultrasonic wave is between 1.5 MHz and 2.5 MHz.

14. The device in accordance with claim 13, wherein the frequency of the second ultrasonic wave is between 15 MHz and 25 MHz.

15. The device in accordance with claim 1, wherein the frequency of the second ultrasonic wave is between 15 MHz and 25 MHz.

16. The device in accordance with claim 1 further comprising a temperature sensor, wherein the temperature sensor is mounted in the accommodation space and configured to sense a temperature in the catheter and/or a temperature outside the catheter, wherein the controller is electrically connected to the temperature sensor and configured to control the at least one first ultrasound module and the at least one second ultrasound module according to the temperature in the catheter and/or the temperature outside the catheter.

* * * * *